July 3, 1923.
J. J. KOHOUT ET AL
1,460,911
AUTOMOBILE BRAKE
Filed March 29, 1921
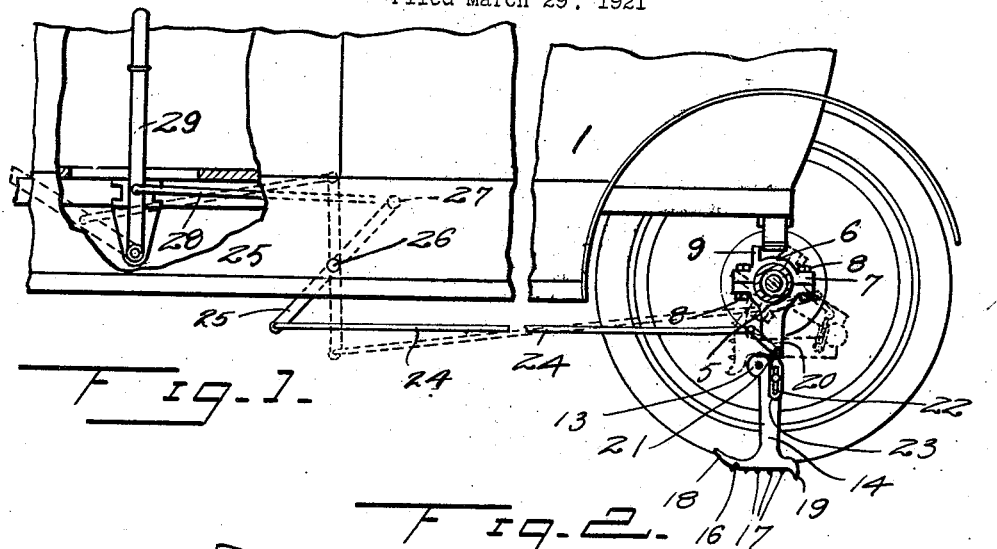
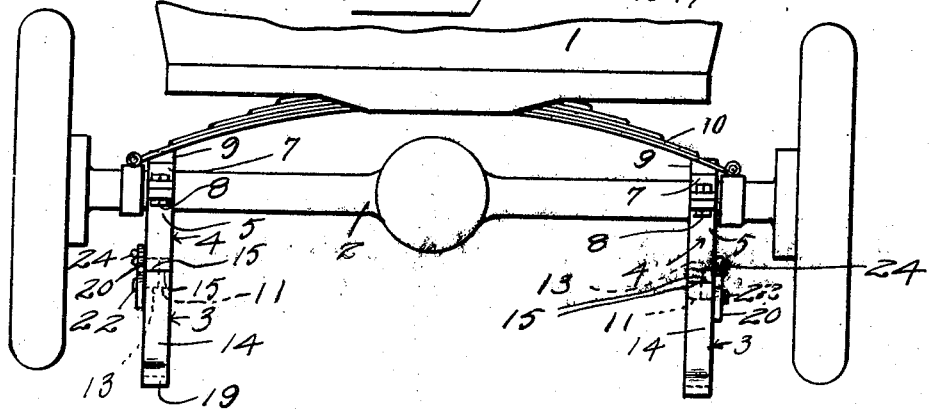
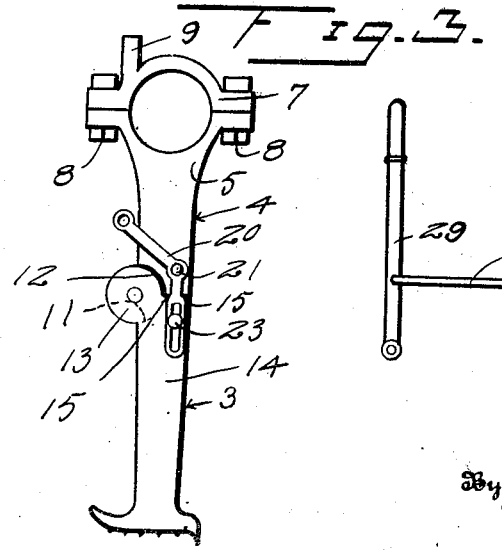
Inventor
J. J. Kohout
T. R. Gunson
By _____ Attorney Patented July 3, 1923.

1,460,911

UNITED STATES PATENT OFFICE.

JERRY J. KOHOUT AND THOMAS R. GUNSON, OF NUNN, COLORADO.

AUTOMOBILE BRAKE.

Application filed March 29, 1921. Serial No. 456,769.

*To all whom it may concern:*

Be it known that we, JERRY J. KOHOUT and THOMAS R. GUNSON, citizens of Bohemia, residing at Nunn, in the county of Weld and State of Colorado, have invented certain new and useful Improvements in Automobile Brakes; and we do hereby declare the following to be a full, clear, and exact description of the invention, such as will enable others skilled in the art to which it appertains to make and use the same.

This invention relates to new and useful improvements in automobile brakes and has for its primary object the provision of means which may be easily and quickly brought into engagement with the ground by the operator to stop the automobile or when desiring to prevent or stop the skidding of said automobile.

Another object of this invention is the provision of a brake of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of our invention, reference is to be had to the following description and accompanying drawings, in which:—

Figure 1 is a fragmentary view illustrating an automobile with our invention applied thereto, Figure 2 is a rear elevation illustrating the same, Figure 3 is a side elevation illustrating the brake, Figure 4 is a fragmentary view illustrating the operating means for the brake.

Referring in detail to the drawings, the numeral 1 indicates as an entirety an automobile and the rear axle 2 thereof has our invention applied thereto which consists of a pair of brakes 3. The brakes 3 are identical in construction with each other and reference to one specifically is thought sufficient for both.

A shank 4 has formed integrally with one end thereof the section 5 of a separable bearing 6. The other section 7 of the bearing 6 is detachably secured to the section 5 by means of bolts 8 which provides a construction which will permit the bearing 6 to be readily assembled on the rear axle 2 of the automobile 1. A stud 9 is formed integrally with the section 7 of the bearing 6 and is adapted to engage some part of the automobile, as for instance the rear spring 10 for the purpose of limiting the pivotal movement of the shank 4 on the axle in one direction. The other end of the shank 4 has formed thereon an ear 11 which is of a thickness less than the thickness of the shank to define shoulders 12. An ear 13 is pivoted to the ear 11 and conforms to the shape of the shoulder 12 and is formed upon a leg 14. The leg 14 and the end of the shank 4 are provided with abutting ends 15 adapted to limit the pivotal movement of the leg in respect to the shank 4 in one direction. The leg 14 has formed upon its end a foot 16 having serrations 17 adapted to bite into the ground when said leg and shank 4 are moved into a plane vertically with each other. The toe portion of the foot 16 is slightly curved upwardly as illustrated at 18 while the heel portion is curved downwardly as illustrated at 19.

A bell crank lever 20 is pivoted to the shank 4 as illustrated at 21 and one of its arm portions is provided with a slot 22 to receive a stud 23 carried by the leg 14, so that upon movement of the bell crank lever on its pivot in one direction, the bearing 6 will be caused to turn about the axle 2 and the leg 14 to move upwardly towards the axle, thus collapsing the brake and on movement of the bell crank lever in a reverse direction, the leg and shank move in alinement with each other, consequently bringing the foot into engagement with the ground.

The bell crank levers 20 of the brakes 3 are connected to rods 24 which are in turn pivoted to arms 25 formed on a rod 26. The rod 26 is journaled to the automobile and has formed thereon an arm 27. A rod 28 is pivoted to the arm 27 and to a pivotally mounted lever 29 which is located in convenient reach of the operator of the automobile, so that the operator may move the foot into and out of engagement with the ground for the purpose of stopping the automobile or to prevent skidding or to break up skidding of the automobile.

While we have shown and described the preferred embodiment of our invention, it will be understood that minor changes in construction, combination, and arrangement of parts may be made without departing from the spirit and scope of the invention as claimed.

Having thus described the invention what is claimed is:—

1. An automobile brake comprising a shank, a bearing section formed integrally with the shank and adapted to engage the rear axle of an automobile, a removable bearing section carried by the first named bearing section and engaging the axle, a projection formed on the removable section and adapted to engage a part of the automobile to limit the movement of the shank in one direction, a ground engaging element hinged to the shank, and means for moving the ground engaging element with respect to the shank and for moving the shank in respect to the axle.

2. An automobile brake comprising a pivotally mounted shank, a leg hinged to said shank, a foot formed on said leg and having a serrated face, a bell crank lever pivoted to said shank and slidably and pivotally connected to the leg, and means for imparting movement to the bell crank lever.

In testimony whereof we affix our signatures in presence of two witnesses.

JERRY J. KOHOUT.
THOMAS R. GUNSON.

Witnesses:
J. A. TURNER,
U. E. MADDEN.